United States Patent
Choi et al.

(10) Patent No.: US 9,261,990 B2
(45) Date of Patent: Feb. 16, 2016

(54) HYBRID TOUCH SCREEN DEVICE AND METHOD FOR OPERATING THE SAME

(71) Applicant: Samsung Electronics Co., Ltd., Gyeonggi-do (KR)

(72) Inventors: Young-Jin Choi, Gyeonggi-do (KR); Ho-Seung Shin, Seoul (KR); Ju-Seung Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 200 days.

(21) Appl. No.: 13/728,337

(22) Filed: Dec. 27, 2012

(65) Prior Publication Data

US 2013/0222294 A1    Aug. 29, 2013

(30) Foreign Application Priority Data

Feb. 24, 2012 (KR) .................. 10-2012-0019316

(51) Int. Cl.
*G06F 3/041* (2006.01)
*G06F 3/0354* (2013.01)

(52) U.S. Cl.
CPC ............ *G06F 3/041* (2013.01); *G06F 3/03545* (2013.01); *G06F 3/03547* (2013.01); *G06F 3/0416* (2013.01)

(58) Field of Classification Search
USPC ................................................ 345/173–174
IPC .............. G06F 3/041,3/03545, 3/03547, 3/0416
See application file for complete search history.

(56) References Cited

U.S. PATENT DOCUMENTS

| | | | |
|---|---|---|---|
| 6,806,867 B1 | 10/2004 | Arruda et al. | |
| 2002/0015024 A1 | 2/2002 | Westerman et al. | |
| 2006/0109252 A1* | 5/2006 | Kolmykov-Zotov et al. | 345/173 |
| 2009/0267905 A1* | 10/2009 | Hsu ........................ | G06F 3/044 345/173 |
| 2010/0038152 A1* | 2/2010 | Kaneda ............... | G06F 3/03545 178/18.07 |
| 2010/0245273 A1 | 9/2010 | Hwang et al. | |
| 2011/0053636 A1* | 3/2011 | Park .......................... | 455/550.1 |
| 2011/0242005 A1* | 10/2011 | Ung et al. ................... | 345/173 |
| 2012/0032909 A1 | 2/2012 | Wang | |
| 2012/0044162 A1* | 2/2012 | Liu et al. ....................... | 345/173 |
| 2012/0092277 A1* | 4/2012 | Momchilov ............ | G06F 3/038 345/173 |
| 2012/0139849 A1* | 6/2012 | Syu et al. ..................... | 345/173 |

(Continued)

FOREIGN PATENT DOCUMENTS

KR    10-2009-0063042 A    6/2009
KR    10-2010-0114328 A    10/2010

(Continued)

*Primary Examiner* — Jason Olson
*Assistant Examiner* — Deeprose Subedi
(74) *Attorney, Agent, or Firm* — Cha & Reiter, LLC

(57) ABSTRACT

A hybrid touch screen device applied to an electric device. The hybrid touch screen device preferably includes a touch panel, a pen touch panel, a display panel, and at least one processor. The touch panel detects an input event by a direct touch. The pen touch panel detects a touch pen input and an input event from an entry into a predetermined detection distance before a touch. The display panel displays a screen according to the touch panel, the pen touch panel, and a user operation. The processor also performs control to execute a relevant function according to an input event inputted to the touch panel and the pen touch panel. The processor also performs control so that an input event of the touch pen and an input event of the touch panel are detected independently of each other.

15 Claims, 9 Drawing Sheets

(56) References Cited

U.S. PATENT DOCUMENTS

2012/0162127 A1\* 6/2012 Onoda .......................... 345/174
2012/0169663 A1\* 7/2012 Kim ..................... G06F 3/0418
                                                              345/174
2012/0313865 A1   12/2012 Pearce
2013/0033434 A1\* 2/2013 Richardson ........... G06F 3/0488
                                                              345/173

FOREIGN PATENT DOCUMENTS

| KR | 2010/0113792 A | 10/2010 |
| KR | 10-2011-0075134 A | 7/2011 |
| KR | 10-2011-0127107 A | 11/2011 |
| KR | 10-2012-0005741 A | 1/2012 |
| WO | 2011/023225 A1 | 3/2011 |

\* cited by examiner

HYBRID TOUCH SCREEN DEVICE AND METHOD FOR OPERATING THE SAME

CLAIM OF PRIORITY

This application claims the benefit of priority under 35 U.S.C. §119 from Korean Patent application Serial No. 10-2012-0019316 filed in the Korean Intellectual Property Office on Feb. 24, 2012, the contents of which are incorporated herein by reference in its entirety.

BACKGROUND OF THE INVENTION

1. Field of the Invention

The present invention relates generally to a hybrid touch screen device for an electronic device, and a method of operating thereof. More particularly, the present invention is related to improving accuracy in data entry of a hybrid touch screen device including a hybrid touch panel using different touch modes.

2. Description of the Related Art

In general, there are various kinds of electronic devices that include input units for data input and output units for data output. A typical example of such an input unit may be a key button unit, and a typical example of the output unit may be a display unit including a liquid crystal display (LCD) module.

More recently, a touch screen device have been developed that can perform data input/output (I/O) and display data at the same position in order to considerably reduce the size of an electronic device and diversify functions thereof. In such a touch screen device, a transparent touch panel is disposed on an LCD module to perform input and output simultaneously. Touch panels are generally classified into various types based on their physical construction/mode of operation, for example, a resistive touch panel, a capacitive touch panel, an ultrasonic touch panel, an optical (infrared) sensor touch panel, and an electromagnetic induction touch panel.

In general, a touch screen device inputs accepts data input by using a user's finger or a stylus. The conventional stylus merely provides a thinner way to touch items on the screen in lieu of a finger. However, recently, a hybrid touch screen device has been developed that includes a pen-shaped input unit (generally referred to as a touch pen) as an auxiliary data input unit and a user can selectively input data by such a touch pen. The touch screen device includes a touch panel and a separate sensing unit, and separately uses data input by the touch pen and data input by the touch panel.

When a touch pen is used separately from a data input mode of a touch panel as described above, the typical mode of operation is by electromagnetic induction. In other words, a pen touch panel in which a plurality of coils are disposed perpendicular to each other (generally referred to as a digitizer panel) is included in an electronic device as a sensing unit for the touch pen that is separate from a touch panel, and a resonance circuit is included in a touch pen. An alternating current (AC) signal is applied to a coil of a sensing pad for operation. When a touch pen is adjacent to a display panel of such an electronic device, a coil of a pen touch panel adjacent to the touch pen forms a magnetic field. In resonance with the magnetic field, a resonance frequency is generated by the touch pen. The resonance frequency is detected by a control unit of the electronic device, so that a relevant touch position can be determined.

Furthermore, in addition to detecting and displaying only a touch position of a touch pen, for example, the thickness of handwriting can be represented according to a pen pressure at which a user presses the touch pen against a display panel of an electronic device. Accordingly, a feeling of actually using a pen is given to the user, thus increasing the use convenience.

On the other hand, an electric device having a hybrid touch screen device generally uses a capacitive touch panel to detect a user's finger, and generally uses an electromagnetic induction pen touch panel to detect an input of a touch pen. Thus, there are two recognition systems required for the hybrid touch screen device to be operable.

However, in the above-described hybrid touch screen device, data may be accidentally or unintentionally inputted in situations that are not intended by the user. For example, when the user touches a portion of his or her palm to the touch screen device of the electronic device (what is referred to as a "palm touch") while holding the touch pen in order to use a touch pen function, not the pen touch panel but the main touch panel configured for detection of a finger detects the palm touch, so that data input is randomly detected. This is an input error from the viewpoint of the user, and also degrades product reliability, as the device cannot determine an accidental touch, such as a palm touch, from a purposeful touch.

SUMMARY OF THE INVENTION

The present invention advantageously solves at least some of the above problems and/or disadvantages and provides at least the advantages below. Accordingly, an object of the present invention is to provide a hybrid touch screen device capable of achieving input reliability, and a method for operating the same.

Another exemplary object of the present invention is to provide a hybrid touch screen device capable of preventing an input error, which may be caused by an unintended touch, by operating a pen touch and a finger touch independently of each other, and a method for operating the same.

Another exemplary object of the present invention is to provide a hybrid touch screen device capable of preventing an input error that can be caused by a palm touch, by detecting the prior use of a touch pen, and a method for operating the same.

Yet another exemplary object of the present invention is to provide a hybrid touch screen device capable of improving product reliability by more accurately performing a touch operation according to a user's intention, and a method for operating the same.

In addition, a hybrid touch screen device that recognizes both direct touch and a use of a touch pen preferably comprises:

a touch panel that detects a direct touch input event made by a direct touch of the touch panel;

a pen touch panel that detects a touch pen input and detects a touch pen input event from an entry of a touch pen within a predetermined detection distance before a touch;

a display panel for displaying a screen according to selection of the touch panel, the pen touch panel, and a user operation; and at least one processor controlling execution of a relevant function according to a type of input event as detected by the touch panel and the pen touch panel, respectively;

wherein the at least one processor control so that the direct touch input event of the pen touch panel and the direct touch input event of the touch panel are detected independently of each other. According to still another exemplary aspect of the present invention, a hybrid touch screen device applied to an electric device preferably includes: a touch panel for detecting an input event by a direct touch; a pen touch panel for detecting a touch pen input and detecting an input event from an entry into a predetermined detection distance before a touch; a display panel for displaying a screen according to the touch panel, the pen touch panel, and a user operation; and at least one processor configured to control execution of a relevant function according to an input event received by the touch panel and the pen touch panel, wherein the processor is configured to control so that an input event of the touch pen and an input event of the touch panel are detected independently of each other.

According to exemplary another aspect of the present invention, a method for operating a touch screen device including a touch panel for detecting an input event by a direct touch and a pen touch panel for detecting a touch pen input and detecting an input event from an entry into a predetermined detection distance before a touch preferably includes: determining whether an approach of a touch pen is detected by the pen touch panel; and deactivating a touch panel function and executing only an input event of the touch pen when the touch pen is detected, wherein an input event of the touch pen and an input event of the touch panel are controlled independently of each other.

According to yet another exemplary aspect of the present invention, a method for operating a touch screen device including a touch panel for detecting a user touch and a pen touch panel for detecting a touch pen input event preferably includes: determining whether an N-point touch more than allowable input touch points is generated on the touch panel; discarding an input event and deactivating a touch panel function when the N-point touch is generated; and executing only a pen touch panel function when a touch pen is detected by the pen touch panel.

BRIEF DESCRIPTION OF THE DRAWINGS

The above and other exemplary objects, aspects, features and advantages of the present invention will become more apparent to a person of ordinary skill in the art from the following detailed description when taken in conjunction with the accompanying drawings in which.

DETAILED DESCRIPTION

Exemplary embodiments of the present invention will now be described herein below with reference to the accompanying drawings. In the following description, detailed descriptions of well-known functions or configurations may be omitted when their inclusion would unnecessarily obscure appreciation by an artisan of the subject matter of the present invention. Also, the terms used herein are defined according to the functions of the present invention. Thus, the terms may vary depending on users' or operators' intentions or practices. Therefore, the terms used herein should be understood based on the descriptions made herein and not strictly by dictionary definitions.

In the examples provided regarding the present invention, a portable terminal including a hybrid touch screen device is illustrated and described as an electronic device; however, the presently claimed invention is not limited thereto. The electronic device may be any device including a hybrid touch screen device. Examples of the electronic device may include a personal digital assistant (PDA), a laptop computer, a smart phone, a netbook, a mobile Internet device (MID), an ultra mobile personal computer (UMPC), a tablet PC, a navigation device, and an MPEG Audio Layer-3 (MP3) player, just to name a few possibilities.

Hereinafter, a hybrid touch screen device and a method for operating the same according to the present invention will be described.

Definitions:

(1) An artisan should understand and appreciate that the term "direct touch input event" as used herein refers to detecting contact on a touch panel by a finger or conventional stylus.

(2) An artisan should also understand and appreciate that the term "touch pen input event" as used herein refers to detecting that a touch pen is positioned at least within a predetermined distance of a pen touch panel.

It should also be understood that both the touch panel and pen touch panel may have coatings or protective sheaths thereon and contact with such coating or protective sheaths is considered to be a touch input for the respective panels.

Figure 1:
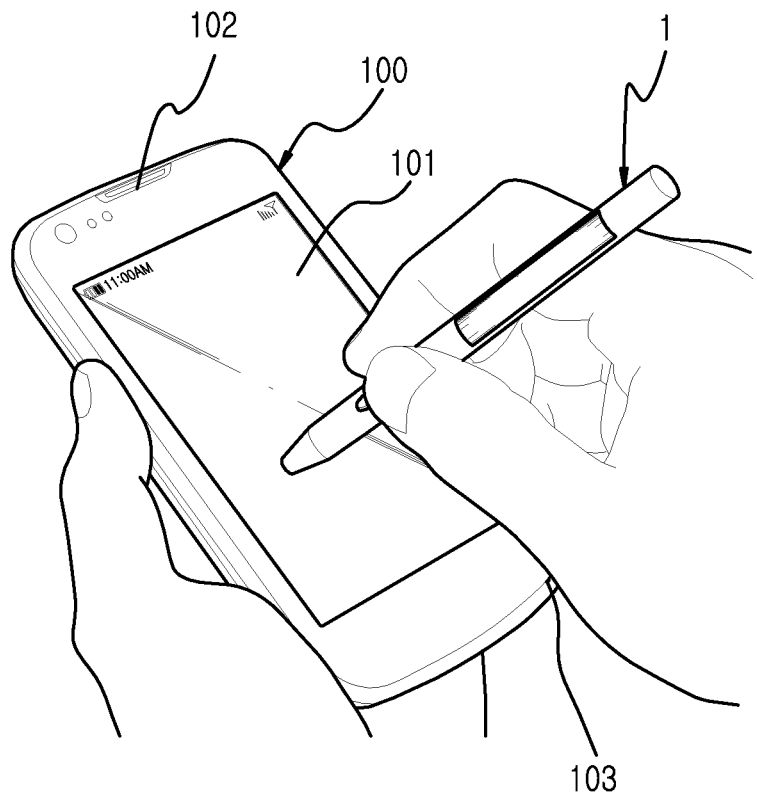
FIG. 1 is a perspective view illustrating a state of operating a hybrid touch screen device of a portable terminal by a touch pen according to an exemplary embodiment of the present invention.
Figure 2:
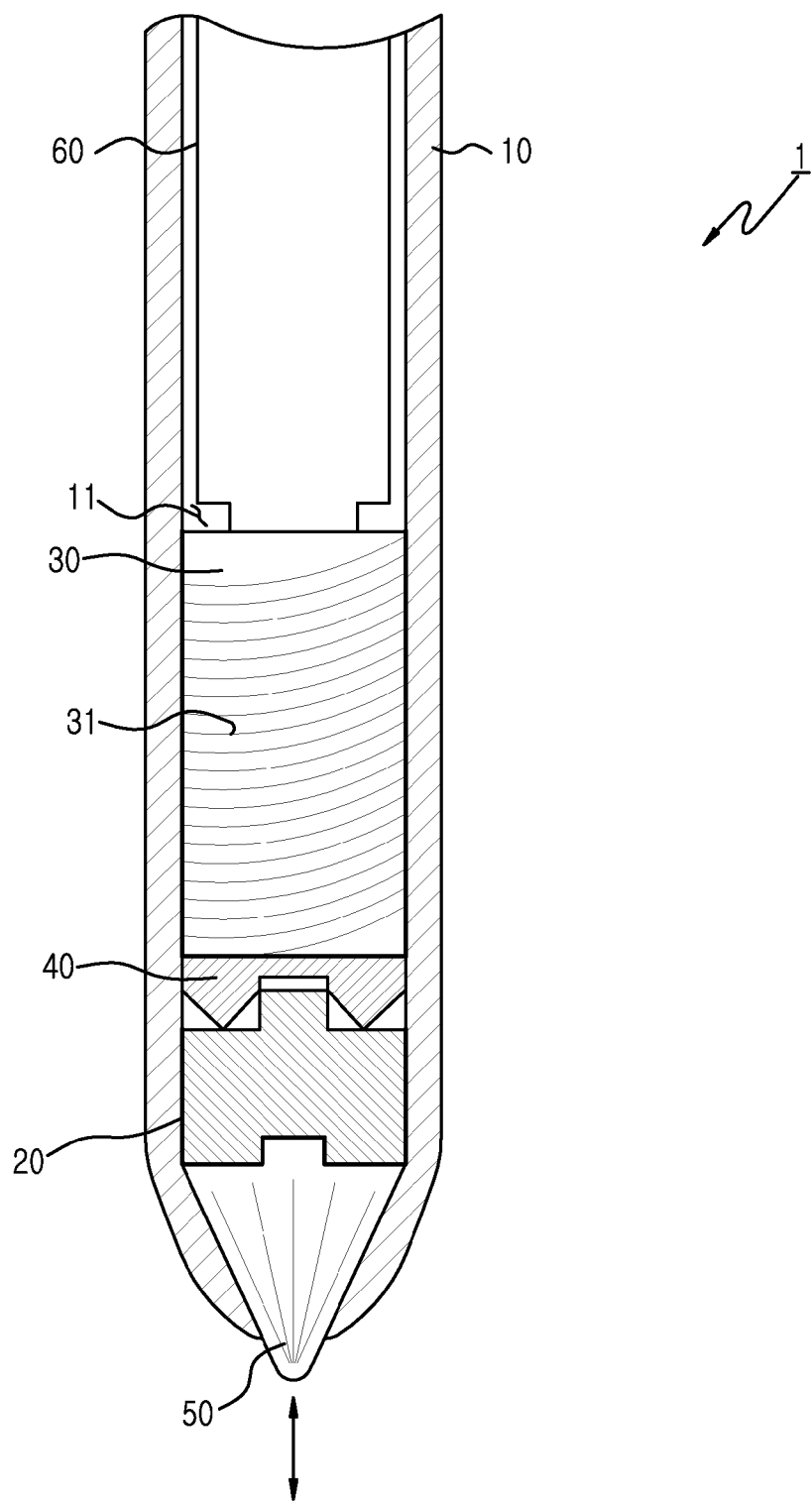
FIG. 2 is a cross-sectional view illustrating a configuration of the touch pen of FIG. 1 according to the present invention.

FIG. 1 is a perspective view illustrating an example of operation of a hybrid touch screen device of a portable terminal by a touch pen according to an exemplary embodiment of the present invention; and FIG. 2 is a cross-sectional view illustrating a configuration of the touch pen of FIG. 1 according to the present invention.

Referring now to FIGS. 1 and 2, a portable terminal 100 preferably includes a touch screen device 101 disposed at a front side thereof, an ear piece 102 disposed at a top side thereof, and a microphone 103 disposed at a bottom side thereof.

The touch screen device 101 of the portable terminal 100 comprises a hybrid touch screen device that includes a touch panel (182 of FIG. 3) that detects a touch by a body of a user such as a finger or a palm, and a pen touch panel (183 of FIG. 3) for detecting an input by a touch pen 1, which will be described later.

Preferably, the touch panel 182 comprises a capacitive touch panel or a resistive touch panel. The touch panel 182 is preferably a touch panel for detecting an input of data when a finger of a user is directly touched to a surface of the touch screen device 101.

More preferably, the pen touch panel 183 comprises an electromagnetic induction touch panel that detects the approach of a touch pen when the touch pen approaches within a predetermined distance before being touched to a touch screen device. Preferably, the predetermined distance may be about 2 cm. The pen touch panel 183 may also be a spatial touch panel such as an infrared touch panel or a sonic touch panel, which would detect the presence of a pen according to their respective technology. Also, there are other types of touch panels that can be used that are within the spirit of the invention and the scope of the appended claims In the present invention, a capacitive touch panel is used as a touch panel 182 for detecting a body of a user such as a finger or a palm, and an electromagnetic induction digitizer panel is used as a pen touch panel 183.

According to an exemplary aspect of the present invention, when a user moves a touch pen so as to approach to a detection region, without actually touching a touch screen device, a body detection function of a touch panel is deactivated, thereby preventing an input error that may be caused by a palm touch of the user. Accordingly, even when the user puts his palm on the touch screen device while using the touch pen, a data input error caused by a body touch can be prevented.

When one looks at the natural writing style of a user holding a conventional pen, the user typically rests a portion of their hand on the page. Therefore, a user gripping a touch pen and approaching the electronic device to write something is likely to contact the screen with their palm or even the edge of their hand against the touch panel.

As illustrated in FIG. 2, a touch pen according to the present invention includes a hollow housing 10 having a predetermined length, a tip 50 that is installed to be movable in an interior space 11 of the housing 10. One end of the tip 50 is positioned to be exposed outside the housing 10. A magnetic body 20 moves with the tip, a coil body 30 installed so as to be spaced apart from the magnetic body 20 by a predetermined distance a substrate 60 having a resonance circuit for inducing an inductance change according to a change in distance from the coil body 30 by the movement of the magnetic body 20, and an elastic body 40 for maintaining the predetermined distance between the magnetic body 20 and the coil body 30 and changing the predetermined distance between the magnetic body 20 and the coil body 30 to a different value when the elastic body 40 is being deformed while the tip 50 is pressed against a surface of the display.

A portion of the tip 50 is formed to protrude from an opening formed at an end of the housing 10, and the magnetic body 20 is installed at an installation side of the tip 50 that does not protrude from the body of the pen. In this case, a protrusion may be formed at the installation side of the tip 50, and a groove may be formed at a bottom side of the magnetic body 20, so that the magnetic body 20 may be moved with the tip 50.

Preferably, a ferrite chip may be used as the magnetic body 20. A guide protrusion is protrusively formed at a top side of the magnetic body 20, and is seated in a guide groove formed at the elastic body 40. The coil body 30 may include a coil 31 that is wound on an outer periphery of a bar-type ferrite core a plurality of times. Also, the coil body 30 may be closely fixed to the fixed substrate 60 so that the coil body 30 is stationary within the interior space 11 of the housing 10.

With continued reference to FIG. 2, the elastic body 40 is interposed between the magnetic body 20 and the coil body 30. The elastic body 40 causes the magnetic body 20 and the coil body 30 to be spaced apart from each other by a predetermined distance, supports the magnetic body 20 that is pushed by the tip 50 toward the coil body, and provides a restitution force to maintain the original distance of the magnetic body 20 from the coil body 30 when a force applied to the tip 50 (that is, a pen pressure) is removed. The elastic body 40 may be formed of a material capable of maintaining an original shape even when used for a long period, such as rubber and silicon. Virtually any type of non-conductive spring can be used.

Figure 3:
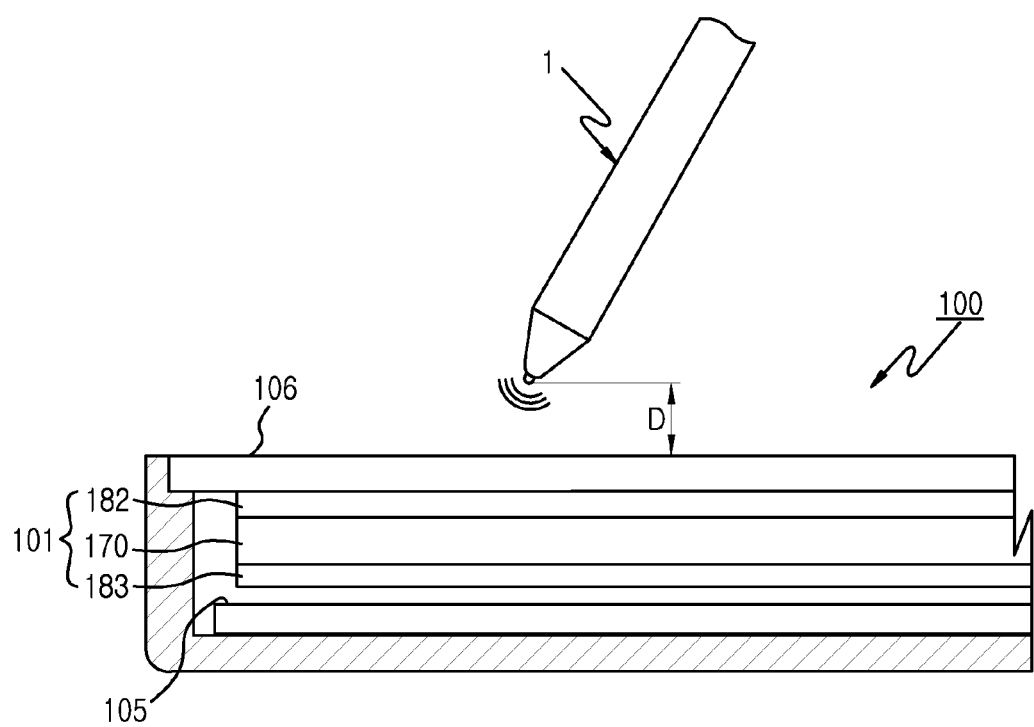
FIG. 3 is a cross-sectional view illustrating a state where the touch pen of FIG. 1 is applied to an electronic device according to the present invention.

FIG. 3 is a cross-sectional view illustrating a state where the touch pen of FIG. 1 is applied to a portable terminal according to the present invention.

Referring now to FIG. 3, in the portable terminal 100, a pen touch panel 183, a display unit 170, and a touch panel 182 are sequentially mounted in an interior installation space of a case frame to constitute the hybrid touch screen device 101. The transparent touch panel 182 is preferably installed by a deposition process at a bottom surface of a window 106 of the portable terminal 100, and the display unit such as, for example, an LCD module may be installed under the touch panel 182.

Although not illustrated, the pen touch panel 183 may include a sensor printed circuit board (PCB) in which a plurality of X-axis coil arrays and Y-axis coil arrays are disposed so as to be perpendicular to each other, a shield plate that is installed under the sensor PCB to block an external electromagnetic wave, and a connector that is electrically connected to a main board 105 of the portable terminal 100. Also, since the pen touch panel 183 includes a shading coil, the inventors find it preferable that the pen touch panel 183 is disposed under the display unit 170 and a separate touch panel formed of a transparent material. However, the present invention is not limited thereto, and an arrangement of the touch panel 182, the display unit 170, and the pen touch panel 183 may be changed according to other exemplary embodiments or need.

As shown in FIG. 3, according to an aspect of the present invention, when the touch pen 1 approaches within a predetermined distance (D) from the window 106 of the portable terminal 100, the pen touch panel 183 detects the approach of the touch pen 1. In this case, the portable terminal 100 detects the use of the pen touch panel 183, and deactivates a user finger detection function of the touch panel 182. Accordingly, even when the touch pen 1 approaches within a detection distance of the portable terminal 100 and then a palm of a user is touched to a top surface of the window of the portable terminal, an undesired data input can be prevented.

Figure 4:
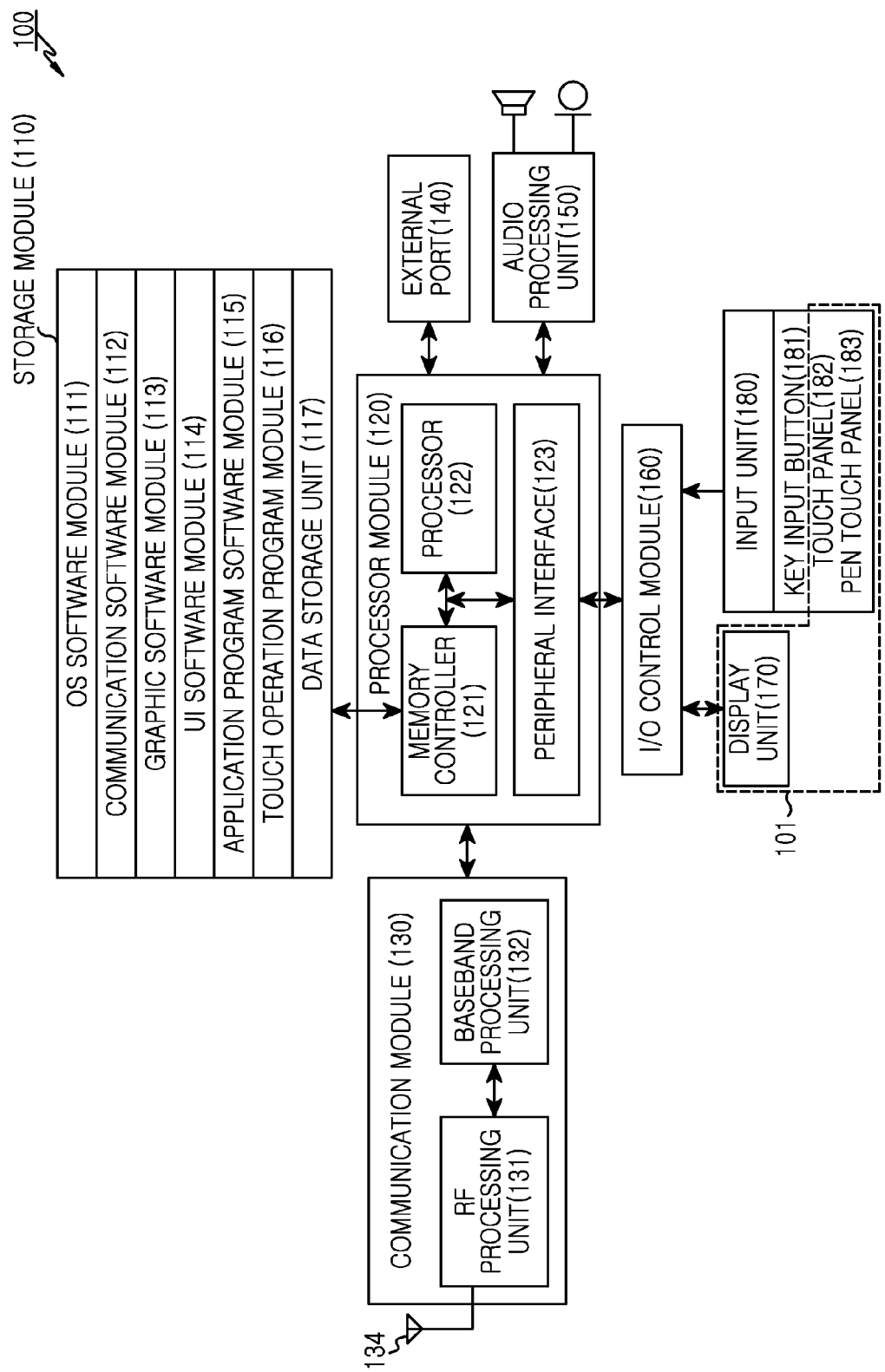
FIG. 4 is a block diagram of the portable terminal of FIG. 1 according to the present invention.

FIG. 4 is a block diagram of the portable terminal of FIG. 1 according to the present invention.

A portable terminal according to the present invention may include a storage module 110, a processor module 120, a communication module 130, an external port 140, an audio processing unit 150, an input/output (I/O) control module 160, a display unit 170, and an input unit 180. Herein, the storage module 110 and the external port 140 may be provided in plurality, and the display unit 170 may include an LCD module as a display module.

The processor module 120 preferably includes a memory controller 121, a processor 122 that may be embodied as processor or microprocessor, and a peripheral interface 123. Herein, the processor 122 may be provided in a plurality.

The communication module 130 may include a radio frequency (RF) processing unit 131 and a baseband processing unit 132.

All of the above-described elements comprise hardware and may be implemented by one or more integrated circuits (ICs) configured with firmware, software, and/or or a combination of hardware and software.

The storage unit 110 is a non-transitory machine readable medium and may include a dedicated program storage unit that stores machine executable code that configures the various processors or microprocessors into special purpose processors for controlling operations of the portable terminal, and a data storage unit 117 for storing data generated during the execution of a program.

For example, the program storage unit may include an operating system (OS) software module 111, a communication software module 112, a graphic software module 113, a user interface (UI) software module 114, at least one application program software module 115, and a touch operation program module 116 according to the present invention. Each of these modules stored on machine readable mediums and are loaded into hardware for configuration of hardware to execute particular functions for which they were designed.

The OS software module 111 may include at least one software component and executed by a controller, for example, for controlling a general system operation. In this case, the OS software module 111 may also perform a function for smooth communication between a plurality of hardware (devices) and a software component. An artisan should appreciate that the components of the present invention are not software per se, as the claimed invention comprises statutory subject matter.

The communication software module 112 may include at least one software component when executed to provide communication through the RF processing unit 131, or the external port 140 and for processing data that are transmitted or received.

The graphic software module 113 may include at least one software component that is loaded into and executed by a processor for providing and displaying graphics on the display unit 170. A special graphics processor can be used.

The UI software module 114 may include at least one software component related to a user interface and that is executed to provide functionality this aspect of the present invention.

With continued reference to FIG. 4, the application program software module 115 may include a software component that is loaded into and executed by a processor to provide at least one application (or "app") installed in the portable electronic device 100.

The touch operation program module 116 may include a software component that is loaded into a processor for execution of a function for correcting a touch error that is detected by a pen touch panel IC and a touch panel IC included in the I/O control module 160, and may also include various routines for supporting a hybrid touch panel operation according to the present invention. For example, the touch operation program module 116 may include a routine for activating the touch panel 182 and the pen touch panel 183, and a routine that is loaded into a processor and executed for collecting a hand touch event (for example, by a finger) and a pen touch event in the process of activating the touch panel 182 and the pen touch panel 183.

Also, the touch operation program module 116 may include a routine that is loaded into a processor and executed for determining types of input touch events by detecting information corresponding to device information of a touch panel and device information of a touch pen based on a digitizer corresponding to a pen touch panel. Also, the touch operation program module 115 may include a routine that is loaded into a processor and executed for discriminating between a body touch event and a pen touch event that are collected, and a routine that is loaded into a processor and executed for operating the discriminated touch events with reference to a predetermined touch operation table.

The memory controller 121 of the processor module 120 may control an access to the storage module 110 by other component such as the processor 122 or the peripheral interface 123. Also, the processor module 120 may control information collection and output and various signal flows that are necessary to support a hybrid touch panel operation according to the present invention.

According to an aspect of the present invention, when an approach of the touch pen is detected by the pen touch panel 183, the processor module 120 deactivates a body touch detection function of the touch panel 182 and performs control to detect only an input of the touch pen. Accordingly, even when the user touches his or her body such as a palm to the touch screen device immediately before or during the input of the touch pen, an input by the touch panel is not performed because the touch panel 182 has a deactivated touch function, so that a data input error can be prevented.

With continued reference to FIG. 4, the peripheral interface 123 may control the connection of the processor 122 and the storage module 110 and a peripheral I/O device of the portable terminal 100.

The processor 122 is configured to perform control so that the portable terminal provides various services such as voice communication and data communication. Also, the processor 122 executes a software module stored in the storage module 110, and performs control to provide a multimedia service corresponding to the software module.

The memory controller 121, the processor 122, and the peripheral interface 123 of the processor module 120 may be implemented by a single integrated circuit (IC) chip or by separate IC chips.

The RF processing unit 131 of the communication module 130 process RF signals that are transmitted/received through an antenna 134. For example, the RF processor 131 may convert a baseband signal received from the baseband processing unit 132 into an RF signal, and transmit the RF signal through the antenna 134. Also, the RF processing unit 131 may convert an RF signal received through the antenna 134 into a baseband signal, and transmit the baseband signal to the baseband processing unit 132. Herein, the RF processing unit 131 may include an RF transceiver, an amplifier, a tuner, an oscillator, a digital signal processor, a codec chip set, and a subscriber identity module (SIM).

The external port 140 may include a connection interface for connecting the portable terminal to other device directly or through a network. For example, the external port 140 may include a charge interface for charging an electronic device. The external port is not limited to any particular standard of connection interface.

The audio processing unit 150 may generate an audio packet between the user and the portable electronic device 100 through a speaker and a microphone, and provides an audio interface.

The I/O control module 160 as shown provides an interface between, as shown in this example, the display unit 170 including a display module, an I/O unit such as the input unit 180 including a key input button 181, a touch panel 182, and a pen touch panel 183 according to the present invention, and the peripheral interface 123. In this case, the I/O control module 160 may include a driver IC for determining touch coordinates according to input information received from the touch panel and the pen touch panel.

Under the control of the graphic software module 113, the display unit 170 may display status information of the portable electronic device 100, characters inputted by the user, moving pictures, and still pictures. Also, the display unit 170 may display touch information inputted to the touch panel and pen touch panel of the input unit.

Figure 5:
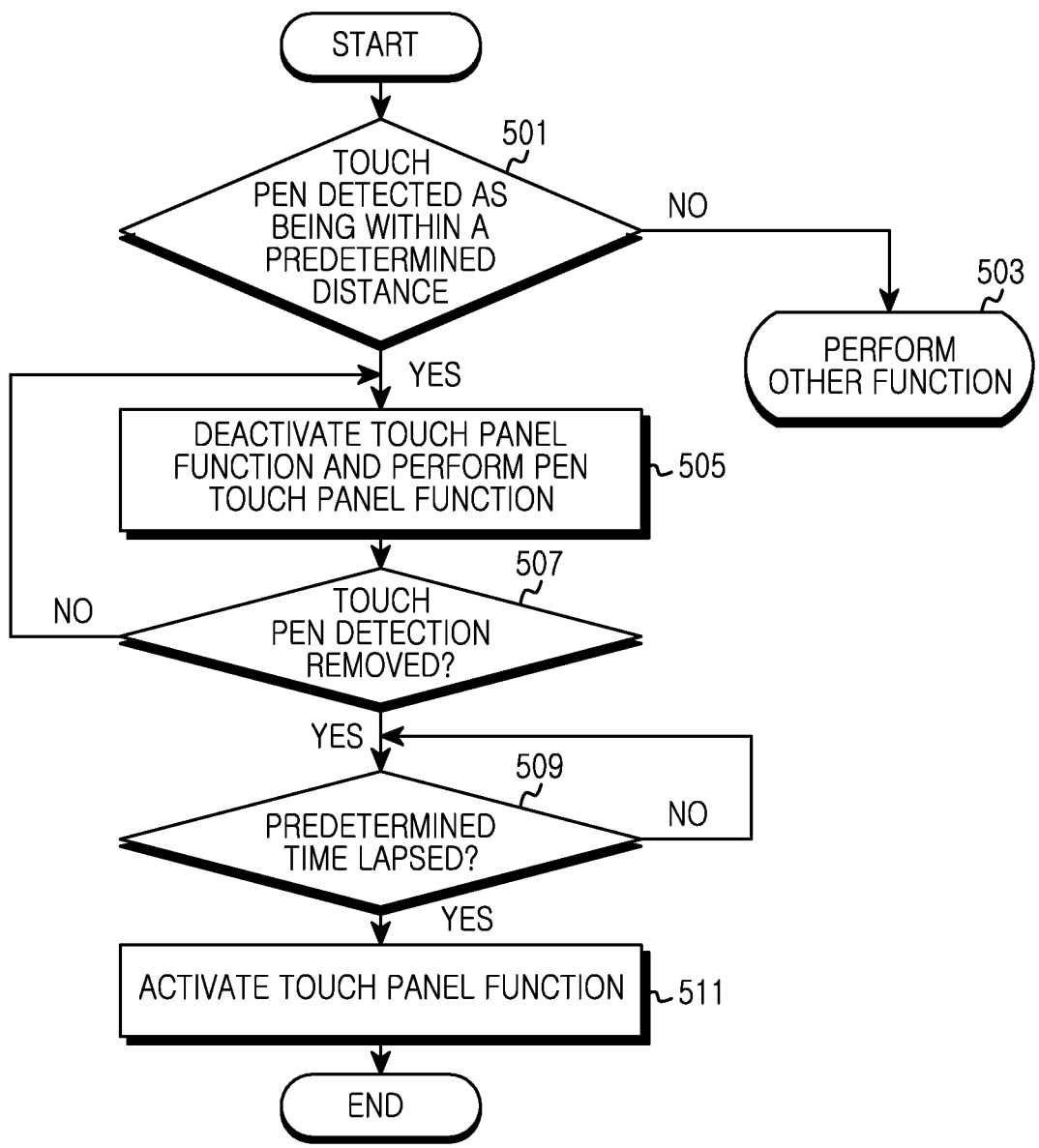
FIG. 5 is a flow diagram illustrating an exemplary process for operating a touch by the touch pen of FIG. 1 and a touch by a human body independently of each other according to the present invention.

FIG. 5 is a flow diagram illustrating an exemplary process for operating a touch by the touch pen of FIG. 1 and a touch by a human body independently of each other according to the present invention.

Referring now to FIG. 5, at step 501, the portable terminal determines whether the touch pen is detected as being within a predetermined distance of the touch panel. In this case, the touch panel and the pen touch panel are in an activated state. Herein, the touch pen may be detected when approaches within a predetermined distance (D), such as shown in FIG. 3, even without making contact with the touch screen device. Accordingly, it preferable that the touch pen comprises an electromagnetic induction touch pen, but other types of touch pens are within the spirit and scope of the claimed invention. When the touch pen is not detected, then at step (503) the portable terminal performs another function.

However, at step 501 when the touch pen is detected, within a predetermined distance of the pen touch panel the portable terminal at step 505, deactivates a function of the touch panel for detecting a user body touch such as a hand touch or a palm touch, and maintains the state of activation of only the pen touch panel. Thus, even when the user touches his or her palm or finger to the touch screen device at the time point of a touch pen input, an unintended data input is not performed. Accordingly, the user can perform a free data input by a pen touch without concern of data being inadvertently and erroneously input due to the writing with the touch pen.

Thereafter, at step 507, the portable terminal determines whether the touch pen detection is removed. In other words, the portable terminal determines whether the touch pen deviates from the touch screen device beyond the predetermined distance (D). When the touch pen detection is removed, the portable terminal performs step 509, and the portable terminal determines whether a predetermined time has lapsed. When the predetermined time has lapsed, the portable terminal proceeds to step 511. In step 511, the portable terminal activates the touch panel function. Thus, in this embodiment, there is a slight delay by design to wait for the predetermined time to lapse before activating the touch panel, in the event a user inadvertently moved the position of the touch pen.

Although not illustrated, according to the present invention, in the state where a contact-type touch of one or more points is first generated by the user and the touch panel continuously detects an input event (that is, a touch or drag is not removed from a touch screen), when the touch pen is detected, a current input event detected by the touch panel may be canceled and an input event detection function of the touch panel may be deactivated. That is, in this particular exemplary embodiment, only an input event of the touch pen may be detected by the pen touch panel. In this case, when the detection of the touch pen by the pen touch panel is removed, the detection function of the touch panel may be activated immediately or after a lapse of a predetermined time.

Figure 6:
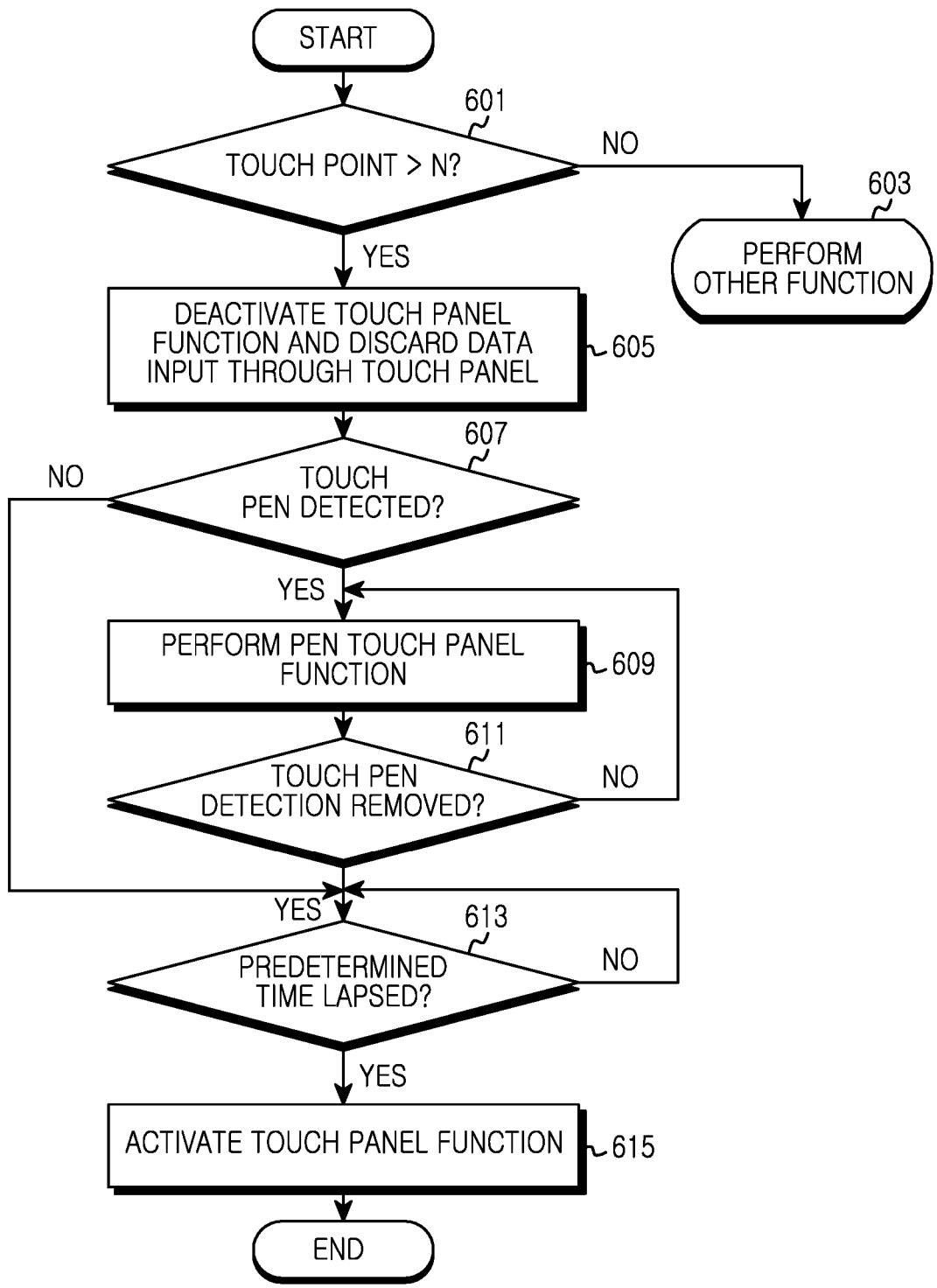
FIG. 6 is a flow diagram illustrating a process for operating a touch by the touch pen of FIG. 1 and a touch by a human body independently of each other according to another embodiment of the present invention.
Figure 7:
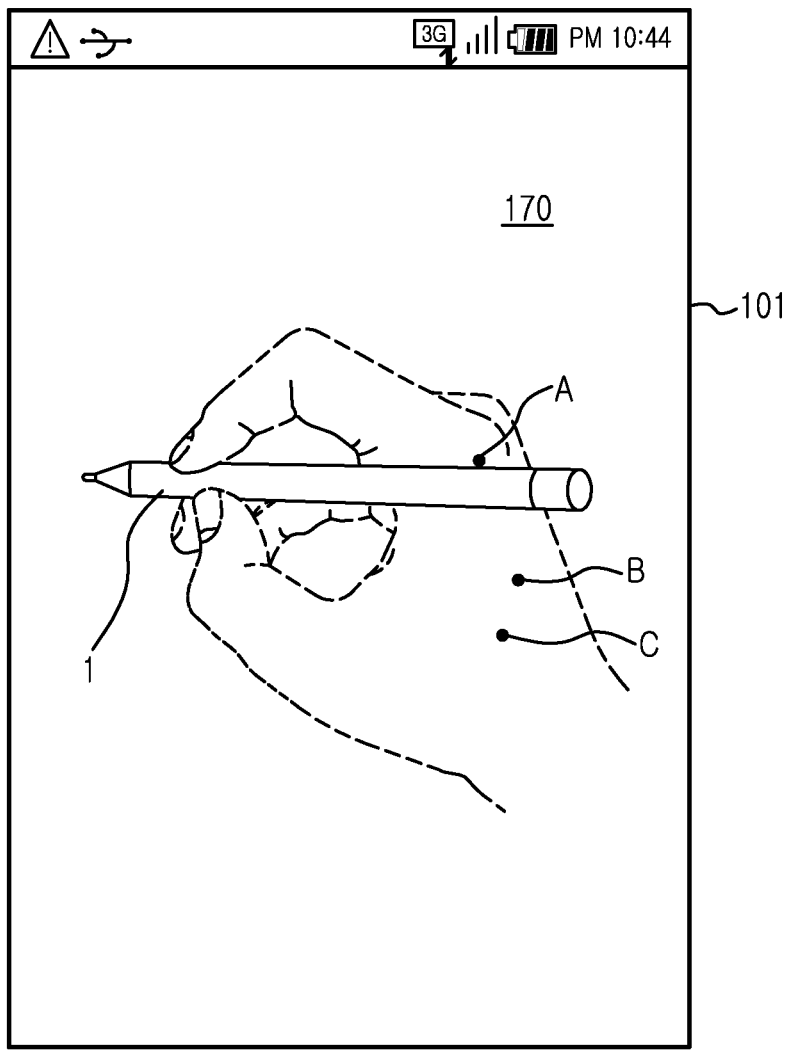
FIG. 7 is a schematic diagram describing the process of FIG. 6 according to the present invention.

FIG. 6 is a flow diagram illustrating another exemplary process for operating a touch by the touch pen of FIG. 1 and a touch by a human body independently of each other according to another exemplary embodiment of the present invention, and FIG. 7 is a schematic diagram describing the process of FIG. 6 according to the present invention.

The present invention may also have a configuration for operating the touch panel and the pen touch panel independently of each other. For example, when an input of the touch pen input is detected by the pen touch panel, a detection function of the touch panel is deactivated, so that an input error caused by a palm touch is prevented. However, the present invention is not limited thereto. For example, regardless of an input of the touch pen, an input error caused by a palm touch may be detected and prevented.

Referring now to FIGS. 6 and 7, at step 601, the portable terminal determines whether a touch point is an N-point touch more than predetermined touch points. For example, although an input touch point detected by the touch panel is a multi-touch, two touch points may be touched simultaneously but more touch points may be detected as an input error. An example of this case is a case where several portions of the user's palm are simultaneously touched to the touch screen device before the user input the touch pen, which is illustrated in FIG. 7. As illustrated in FIG. 7, when the user touches his or her palm onto the display unit of the touch screen device in order to input the touch pen, three touch points such as A, B and C are detected. In this case, the portable terminal at step 605, the portable terminal deactivates a touch panel function, and discards such input data without displaying the same on the display unit. When sensing the touch in which points of the touch are more than or equal to the N points, the touch panel may be deactivated via software or hardware implementation. Also, when sensing the touch in which points of the touch are more than or equal to the N points, the touch in the touch panel may be regarded as an input error.

Thereafter, at step 607, the portable terminal determines whether the touch pen is detected. When the touch pen is detected, the portable terminal at step 6091 executes a pen touch panel function. In other words, the portable terminal may detect a touch position corresponding to an input of the touch pen by the user, and executes a relevant program.

However, when the touch pen is not detected as being within the predetermined distance after detection of a multi-touch point expected to be an input error such as a palm touch, the portable terminal at step 613, determines whether a predetermined time has lapsed. When the predetermined time has lapsed, the portable terminal detects that there has not been a user touch pen input. Then, at step 615, the portable terminal activates the touch panel function.

According to the present invention, regardless of an detection of a presence of the touch pen, when an N-point touch greater than predetermined touch points is generated, the touch panel function is deactivated, thereby preventing an erroneous input of unnecessary data.

Preferably, the N-point touch may comprise a touch input more than 3 points capable of recognizing a user's palm.

Figure 8:
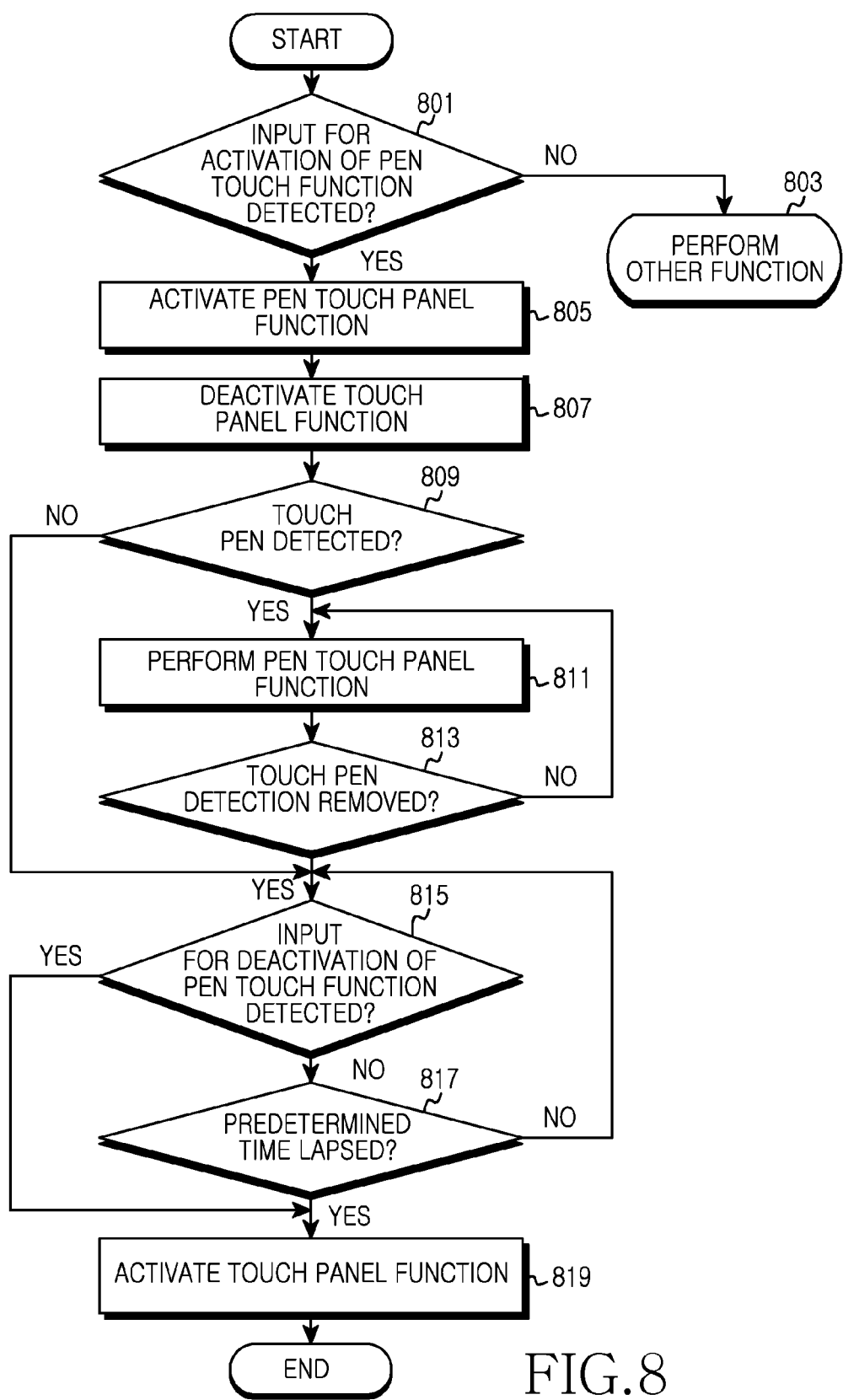
FIG. 8 is a flow diagram illustrating a process for operating a touch by a touch pen and a touch by a human body independently of each other according to another exemplary embodiment of the present invention.
Figure 9:
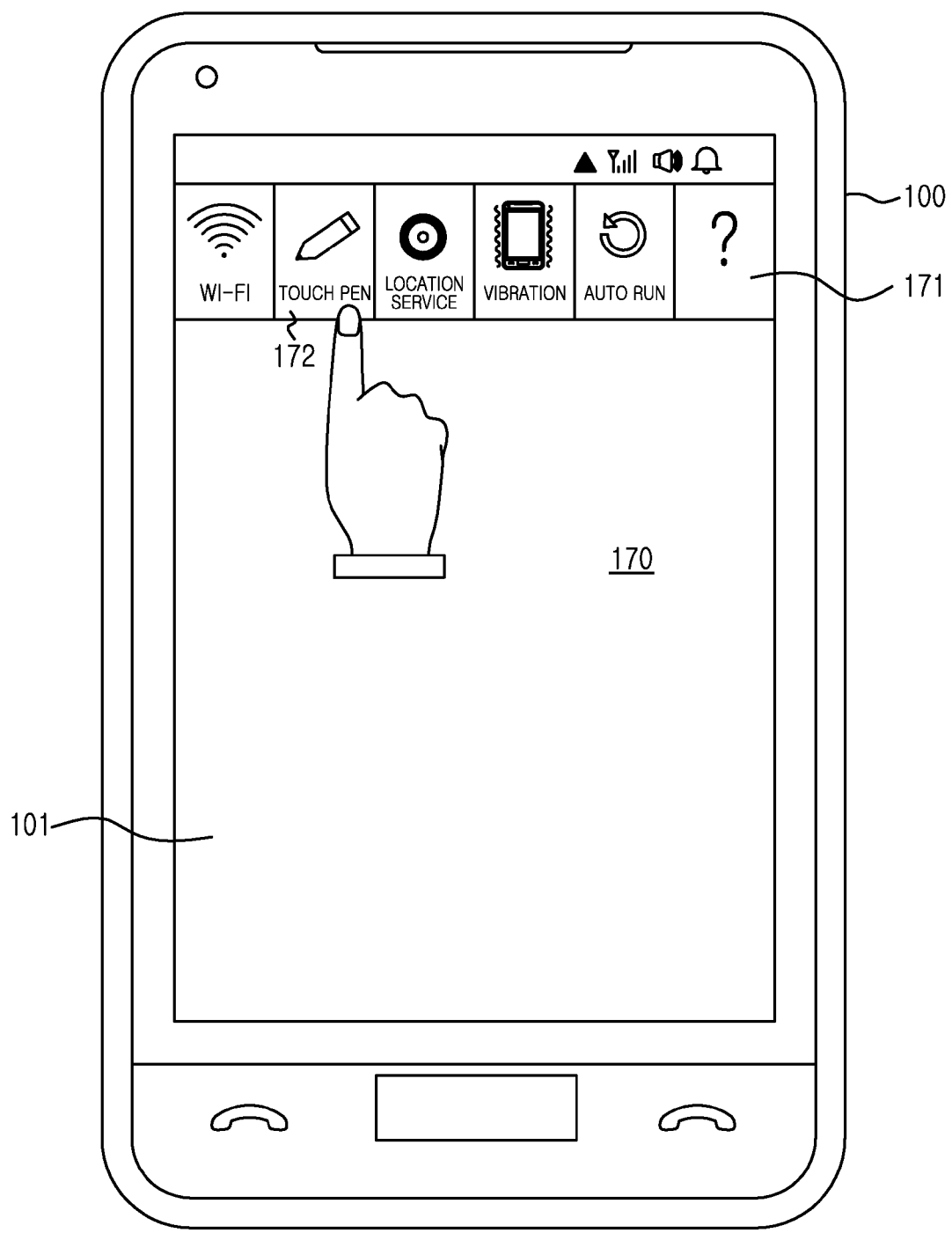
FIG. 9 is a schematic diagram describing the process of FIG. 8 according to the present invention.

FIG. 8 is a flow diagram illustrating an exemplary process for operating a touch by a touch pen and a touch by a human body independently of each other according to another exemplary embodiment of the present invention, and FIG. 9 is a schematic diagram of a screen shot describing the process of FIG. 8 according to the present invention.

According to the present exemplary embodiment, the device includes a separate execution unit for operating the touch panel for detection of a body input and the pen touch panel for detection of an input of the touch pen, independently of each other. The execution unit may be a separate application that is created on the touch screen device. However, the present invention is not limited thereto. For example, the execution unit may be executed by being included in an environment setting menu or may be executed by an input of a separate key button. Thus, when the execution unit is executed, the pen touch panel is activated and the touch panel function is deactivated.

Referring now to FIGS. 8 and 9, at step 801, the portable terminal determines whether an input for activation of a pen touch function is detected. This is an operation of determining whether an execution unit included in the portable terminal is operated. When the input is detected, the portable terminal proceeds to step 805. In step 805, the portable terminal activates the pen touch panel function and at step 807 deactivates the touch panel function. Thus, in the present embodiment, since the pen touch panel is not initially activated, the pen touch panel should be activated by the user.

Regarding this operation, for example, as illustrated in FIG. 9, when a control menu (171) displayed on the display unit (101) of the portable terminal (100) is clicked, the touch panel function may be deactivated simultaneously with the click and the pen touch panel function may be activated. Rather than merely bringing the touch pen to within a predetermined distance, here the touching of the "touch pen" visual switch activates the pen touch panel 183, and deactivates the touch panel 182.

Thereafter, at step 807, the portable terminal deactivates the touch panel 30 function. In step 809, the portable terminal determines whether the touch pen is detected by the activated pen touch panel as being within the predetermined distance (D). When the touch pen is detected, the portable terminal, at step 811, performs relevant functions such as data display corresponding to a touch pen input of the user and program execution.

Thereafter, the portable terminal determines at step 815 whether an input for deactivation of the pen touch function is detected. This step is to detect that an input of the above execution unit is canceled by the user, and the user may intentionally terminate a pen input mode. When the input for deactivation of the pen touch function is detected, the portable terminal performs step 819, and activates the touch panel function.

On the other hand, when the touch pen is not detected despite the activation of the pen touch panel and the deactivation of the touch panel according to an input of the execution unit (step 809), the portable terminal may perform step 815 and the following steps sequentially.

Also, even when the input for deactivation of the pen touch function is not detected at step 815, if the touch pen detection is removed, the portable terminal may perform step 817 and drive a timer for a predetermined time. When the predetermined time has lapsed, the portable terminal may activate the touch panel function (at step 819).

Although the activation and deactivation of the touch pen function by a touch pen icon is illustrated in FIGS. 8 and 9, the touch pen function may also be activated and deactivated directly by a touch icon or voice command. Moreover, the touch panel can be activated while the pen is being used by permitting a particular series of touches, taps, multi-taps, or multi-finger touch, such that the processor is configured to determine that such specialized contact is not inadvertent.

The hybrid touch screen device according to the present invention detects an unintended palm touch before a touch pen input is made, or even while a touch pen input is being made, and prevents an inadvertent and erroneous data input, thereby achieving the input reliability of the device and thus improving the product reliability.

It will be apparent to the person of ordinary skill in the art that there are various methods that can modify the above exemplary embodiments while falling within the scope of the following claims That is, there may be various methods that can implement the present invention without departing from the scope of the following claims The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor" constitute hardware in the claimed invention.

While the invention has been shown and described with reference to certain exemplary embodiments thereof, it will be understood by those skilled in the art that various changes in form and details may be made therein without departing from the spirit and scope of the invention as defined by the appended claims Therefore, the scope of the invention is defined not by the detailed description of the invention but by the appended claims, and all differences within the scope will be construed as being included in the present invention.

What is claimed is:

1. A hybrid touch screen device comprising:
   a touch panel that detects a direct touch input event made by a direct touch on the touch panel;
   a pen touch panel that detects a touch pen input event from an entry of a touch pen within a predetermined detection distance from a surface of the touch screen device;
   a display panel for displaying a screen according to selection of the touch panel, the pen touch panel, and a user operation; and
   at least one processor configured to: execute a relevant function according to a type of input event as detected by the touch panel and the pen touch panel, respectively; deactivate a direct touch input function of the touch panel independently of any direct touch made on the touch panel when the touch pen enters within the predetermined detection distance; and reactivate the touch panel when determining from a timer that the touch pen has not been detected within the predetermined detection distance for a predetermined time,
   wherein the at least one processor cancels an input event currently detected by the touch panel and deactivates an input event detection function of the touch panel, when the touch pen is detected within the predetermined distance of the pen touch panel while a direct touch input event is continuously detected by the touch panel, unless a particular series of touches, taps or multi-finger touch indicative of intentional contact are detected.

2. The hybrid touch screen device of claim 1, wherein the touch panel comprises one of a capacitive touch panel, a resistive touch panel, an ultrasonic touch panel, or an optical touch panel.

3. The hybrid touch screen device of claim 1, wherein the pen touch panel comprises an electromagnetic induction touch panel.

4. The hybrid touch screen device of claim 1, further comprising a separate execution unit for activating a function of the pen touch panel.

5. The hybrid touch screen device of claim 4, wherein the at least one processor deactivates an input event detection function of the touch panel when the separate execution unit determines an input to the pen touch panel is detected.

6. The hybrid touch screen device of claim 4, wherein the execution unit controls display of at least one of an icon created by a user, a shortcut key button provided separately, and a touch pen execution menu included in a setting menu.

7. An electronic device comprising the hybrid touch screen device according to claim 1.

8. The electronic device of claim 7, wherein the electronic device comprises a portable terminal for communication that further includes a communication module comprising, an RF processing unit, a baseband processing unit, and an antenna.

9. A method for operating a touch screen device including a touch panel for detecting an input event by a direct touch of the touch panel and a pen touch panel for detecting a touch pen input, the method comprising:
   determining whether an approach of a touch pen is detected by the pen touch panel as being within a predetermined distance of a surface of the touch screen device;
   if the approach of the touch pen is detected as being within the predetermined distance, canceling an input event currently detected by the touch panel while the direct touch input event is continuously detected by the touch panel, unless a particular series of touches, taps or multi-finger touch, indicative of intentional contact, is detected:
   deactivating a touch panel function independently of any direct touch made on the touch panel, and executing only an input event of the touch pen when the approach of the touch pen to the touch screen device surface within the predetermined distance is detected; and
   reactivating the touch panel function when determining from a timer that the touch pen has not been detected within the predetermined distance for a predetermined time.

10. The method of claim 9, wherein the pen touch panel comprises an electromagnetic induction touch panel.

11. A method for operating a touch screen device including a touch panel for detecting a direct touch input event and a pen touch panel for detecting a touch pen input event, the touch screen device having a front surface through which images of the touch screen device are output, a rear surface, and lateral side surfaces, the front surface having more surface area than any of the lateral side surfaces, the method comprising:
   at the touch screen device:
   determining whether an N-point touch of N simultaneous input touch points generated on the touch panel via touch input on the front surface of the touch screen device is greater than an allowable quantity of simultaneous input touch points;
   discarding the direct touch input event and deactivating a touch panel function when the N-point touch greater than the allowable quantity is generated; and
   executing only a pen touch panel function when a touch pen is detected by the pen touch panel.

12. The method of claim 11, further comprising:
   determining whether the detection of the touch pen stops during the execution of the touch pen input event by the touch pen; and
   activating the touch panel function after a lapse of a predetermined time measured from when the detection of the touch pen stops.

13. The method of claim 11, further comprising activating the touch panel function after a lapse of a predetermined time measured from when the touch pen is not detected by the pen touch panel.

14. The method of claim 11, wherein the N-point touch comprises a condition where at least three touch points are inputted simultaneously.

15. An electronic device with a hybrid touch screen device, the hybrid touch screen device comprising:
   a touch panel that detects a direct touch input event made by a direct touch of the touch panel;
   a pen touch panel that detects a touch pen input event from an entry of a touch pen within a predetermined detection distance from a surface of the touch screen device;
   a display panel for displaying a screen according to selection of the touch panel, the pen touch panel, and a user operation; and
   at least one processor configured to: execute a relevant function according to a type of input event as detected by the touch panel and the pen touch panel, respectively; deactivate a direct touch input function of the touch panel independently of any direct touch made on the touch panel when the touch pen enters within the predetermined detection distance; and reactivate the touch panel when determining from a timer that the touch pen has not been detected within the predetermined detection distance for a predetermined time,
   wherein the at least one processor cancels an input event currently detected by the touch panel and deactivates an input event detection function of the touch panel, when the touch pen is detected within the predetermined distance of the pen touch panel while a direct touch input event is continuously detected by the touch panel.

* * * * *